(12) United States Patent
O'Brien et al.

(10) Patent No.: US 8,216,462 B2
(45) Date of Patent: Jul. 10, 2012

(54) PORTABLE DRINKING WATER PURIFICATION DEVICE

(76) Inventors: Paul W. O'Brien, Tunkhannock, PA (US); Mogens Engel, Tunkhannock, PA (US)

(*) Notice: Subject to any disclaimer, the term of this patent is extended or adjusted under 35 U.S.C. 154(b) by 895 days.

(21) Appl. No.: 12/188,839

(22) Filed: Aug. 8, 2008

(65) Prior Publication Data

US 2009/0039037 A1    Feb. 12, 2009

Related U.S. Application Data (60) Provisional application No. 60/954,719, filed on Aug. 8, 2007, provisional application No. 60/954,787, filed on Aug. 8, 2007, provisional application No. 60/989,077, filed on Nov. 19, 2007.

(51) Int. Cl.
*B01D 35/00* (2006.01)
*B01D 29/62* (2006.01)
*B01D 29/88* (2006.01)
*B01D 35/22* (2006.01)
*C02F 9/00* (2006.01)

(52) U.S. Cl. .......... 210/200; 210/94; 210/106; 210/108; 210/117; 210/136; 210/416.3; 210/236; 210/238; 210/258; 210/335; 210/398

(58) Field of Classification Search .................. None
See application file for complete search history.

(56) References Cited

U.S. PATENT DOCUMENTS

| | | | |
|---|---|---|---|
| 472,547 A * | 4/1892 | Nordtmeyer | 210/416.3 |
| 1,002,332 A | 8/1911 | Dyer | |
| 1,386,450 A | 8/1921 | Woster | |
| 3,608,736 A | 9/1971 | Wong | |
| 3,870,639 A | 3/1975 | Moore et al. | |
| 3,932,277 A | 1/1976 | McDermott et al. | |
| 4,151,092 A * | 4/1979 | Grimm et al. | 210/256 |
| 4,298,475 A | 11/1981 | Gartner | |
| 4,477,347 A | 10/1984 | Sylva | |
| 4,529,511 A * | 7/1985 | Breeden et al. | 210/94 |
| 4,632,757 A | 12/1986 | Rosenberg | |
| 4,643,981 A | 2/1987 | Card | |
| 4,717,476 A | 1/1988 | Scott | |
| 4,769,143 A | 9/1988 | Deutsch et al. | |
| 4,800,018 A | 1/1989 | Moser | |
| 4,816,149 A | 3/1989 | Wekell | |
| 4,828,698 A | 5/1989 | Jewell et al. | |
| 4,832,850 A | 5/1989 | Cais et al. | |
| 4,832,851 A | 5/1989 | Bowers et al. | |
| 4,859,336 A | 8/1989 | Savas et al. | |
| 4,891,134 A | 1/1990 | Vcelka | |
| 4,962,044 A | 10/1990 | Knesel, Jr. et al. | |
| 4,995,976 A | 2/1991 | Vermes et al. | |

(Continued)

FOREIGN PATENT DOCUMENTS

JP    60122016    6/1985

(Continued)

*Primary Examiner* — Benjamin Kurtz
(74) *Attorney, Agent, or Firm* — Clinton H. Wilkinson; Charles A. Wilkinson (57) ABSTRACT

A portable water disinfecting and purification apparatus comprising a first chamber into which water to be purified may be drawn by suction or negative pressure, a second chamber into which the water from the first chamber can be forced by a pumping action or positive pressure, whereby the water is passed across a micro-filter positioned within a section of the second chamber through which water can be forced by said pumping action to an outlet for purified water.

8 Claims, 8 Drawing Sheets

U.S. PATENT DOCUMENTS

| | | | |
|---|---|---|---|
| 5,045,195 A | 9/1991 | Spangrud et al. | |
| 5,078,876 A | 1/1992 | Whittier et al. | |
| 5,106,500 A | 4/1992 | Hembree et al. | |
| 5,120,437 A | 6/1992 | Williams | |
| 5,122,272 A | 6/1992 | Iana et al. | |
| 5,156,335 A | 10/1992 | Smith et al. | |
| 5,156,737 A | 10/1992 | Iana et al. | |
| 5,167,819 A | 12/1992 | Iana et al. | |
| 5,268,093 A | 12/1993 | Hembree et al. | |
| 5,273,649 A | 12/1993 | Magnusson et al. | |
| 5,362,385 A | 11/1994 | Klegerman et al. | |
| 5,366,642 A | 11/1994 | Platter et al. | |
| 5,433,848 A * | 7/1995 | Platter et al. | 210/238 |
| 5,456,831 A | 10/1995 | Sullivan | |
| 5,509,605 A | 4/1996 | Cripe | |
| 5,518,613 A | 5/1996 | Koczur et al. | |
| 5,534,145 A | 7/1996 | Platter et al. | |
| 5,549,816 A | 8/1996 | Harp et al. | |
| 5,569,374 A | 10/1996 | Williams | |
| 5,656,160 A | 8/1997 | Parise et al. | |
| 5,685,980 A | 11/1997 | Patapoff et al. | |
| 5,688,588 A | 11/1997 | Cotton et al. | |
| 5,709,794 A | 1/1998 | Emmons et al. | |
| 5,733,448 A | 3/1998 | Kaura | |
| 5,919,357 A | 7/1999 | Wilkins et al. | |
| 5,928,512 A | 7/1999 | Hatch et al. | |
| 5,981,293 A | 11/1999 | Charlton | |
| 6,010,626 A | 1/2000 | D'Agostino | |
| 6,136,188 A | 10/2000 | Rajan et al. | |
| 6,142,384 A | 11/2000 | Shafik | |
| 6,193,886 B1 | 2/2001 | Nohren, Jr. | |
| 6,200,471 B1 | 3/2001 | Nohren, Jr. | |
| 6,344,146 B1 * | 2/2002 | Moorehead et al. | 210/668 |
| 6,478,956 B2 | 11/2002 | Kaura | |
| 6,569,329 B1 | 5/2003 | Nohren, Jr. | |
| 6,733,669 B1 | 5/2004 | Crick | |
| 6,811,036 B1 | 11/2004 | Vaiano et al. | |
| 6,887,379 B2 | 5/2005 | Schiltz | |
| 6,919,025 B2 | 7/2005 | Cluff et al. | |
| 7,066,336 B2 | 6/2006 | Keeping et al. | |
| 7,226,542 B2 | 6/2007 | Zemel et al. | |
| 7,390,340 B1 | 6/2008 | Schopf, Jr. | |
| 7,402,239 B2 | 7/2008 | Dorward | |
| 7,413,653 B2 | 8/2008 | Powell | |
| 7,438,801 B2 | 10/2008 | Scaringe | |
| 7,476,312 B2 | 1/2009 | Laing et al. | |
| 7,507,338 B2 | 3/2009 | Bommi et al. | |
| 2003/0106851 A1 | 6/2003 | Tremblay et al. | |
| 2004/0040906 A1 | 3/2004 | Jagtoyen et al. | |
| 2004/0144711 A1 | 7/2004 | Cluff et al. | |
| 2005/0035041 A1 | 2/2005 | Nohren, Jr. et al. | |
| 2005/0082320 A1 | 4/2005 | Anue | |
| 2005/0133427 A1 | 6/2005 | Rinker et al. | |
| 2006/0060530 A1 | 3/2006 | Ali | |
| 2006/0124517 A1 | 6/2006 | Scaringe | |
| 2006/0157398 A1 | 7/2006 | Nohren, Jr. | |
| 2007/0163943 A1 | 7/2007 | Collins et al. | |
| 2007/0199875 A1 | 8/2007 | Moorey et al. | |
| 2008/0011662 A1 | 1/2008 | Milosavljevic et al. | |
| 2008/0017565 A1 | 1/2008 | Yanou et al. | |
| 2008/0093303 A1 | 4/2008 | Tremblay et al. | |
| 2008/0197062 A1 * | 8/2008 | Collins et al. | 210/136 |

FOREIGN PATENT DOCUMENTS

| | | |
|---|---|---|
| WO | WO 82/00256 | 2/1982 |
| WO | WO 91/10494 | 7/1991 |
| WO | WO 97/40906 | 11/1997 |

* cited by examiner

PORTABLE DRINKING WATER PURIFICATION DEVICE

CROSS REFERENCE TO RELATION APPLICATION

This application claims the benefit of provisional applications 60/954,719 and 60/954,787 both filed on Aug. 8, 2007, and 60/989,077 filed on Nov. 19, 2007, the disclosures of which are hereby incorporated by reference in their entirety.

BACKGROUND OF THE INVENTION

1. Field of the Invention

The present invention relates to devices for filtering and purifying water to make such water potable, and more particularly to a portable water filtering and purifying device for quickly and simply removing extremely small microbes or other disease causing elements and contaminants from such water.

2. Description of Related Art

Contaminated drinking water is one of the leading causes of health problems throughout the world. While such problems are encountered on a daily basis by millions throughout the world, particularly in less developed countries, ensuring the safety of a supply of water is also a problem for soldiers, hikers, international travelers and others. Various well known waterborne diseases are common in untreated water, caused by microbial agents including protozoan parasites that cause Giardiasis and Cyclosporasis, and Crytosporidium parvum, viruses such as the hepatitis A and other viruses, and bacterium such as E. coli, salmonella typhi which causes Typhoid fever, Vibrio cholerae, and shigella species. Symptoms include fever and diarrhea, rashes, cramps, jaundice, liver disease as well as other diseases, and while in many cases such ailments can be treated if attended to quickly if not treated can worsen and cause permanent serious conditions and often death, particularly in the young, elderly, and those having compromised immune systems.

In addition to untreated water, treated water supplies may also contain contaminants. While most cities and large towns in developed countries have large piped water systems for continually transporting relatively high quality treated water to users, such tap water is only safe to drink if it has been fully treated and disinfected, and if the water system is well operated and maintained. Bottled-water is also increasingly popular throughout the world, and although usually presumed to be safe by most users, may also be contaminated not only by microbial hazards such as those already mentioned above but also by any number of chemical and physical hazards. Possible chemical hazards include lead, arsenic and benzene, while physical hazards include glass chips and metal fragments.

Numerous portable devices for filtering and purifying water to provide a potable water supply from untreated sources such as lakes and streams, or improperly maintained piped water supplies, and other sources are found in the prior art. For example, known are straw-type devices wherein the user places his or her mouth over one end of an elongated casing and sucks inwardly in the same manner as with a conventional straw to cause water to pass across or through a filter in the device. A problem with such suction filtering and purifying devices, however, is that there is a practical limit to the pore size of the openings in the filter elements used, measured in microns, which pore size determines what size particles can pass through the filter. Although obviously the smaller the pore size, the more microbial and other contaminants are filtered from the water, if the pore size of the filter is made too small, it becomes impossible for the user to pass a meaningful amount of water through the filter and straw merely by sucking. For example, while a maximum pore size of 4.0 microns will filter out Giardia cysts, a maximum pore size of 0.2-microns is required to filter out bacteria, which generally have a size of between 0.2 and 10 microns. Viruses, which typically range in size from 0.0004 to 0.1 microns, are too small to be filtered out by most filters, but many viruses will attach themselves to a larger host bacteria, and these viruses can be removed by removing the host bacteria. Even where a pre-filter is used to filter out larger particles that would immediately clog the main filter, the smaller the pore size of the main filter, the more quickly it will become clogged and ineffective. Others types of filtering and purifying devices are known, but they are bulky and inconvenient to carry and use and thus are not truly portable.

The present inventors, recognizing the problems associated with existing portable water filtering and portable has now developed a water purification device that can be carried easily in a backpack, bag, or clothing pocket that can be used with filters having a pore size small enough to filter out some viruses, down to 1 micron, and thus ensures that virtually all contaminants are removed from the water. In addition, another problem with the water filters having small pore sizes is that they quickly become clogged with contaminants and materials that have been removed from the water. As a result, many of such filters must be replaced continually with a new, clean filter, since even if the filter is sterilized by dipping it in a bleach solution or the like to kill harmful parasites and the like, such contaminants although possibly no longer harmful if ingested nevertheless remain trapped in the filter cartridge. This is a problem, particularly in less wealthy countries wherein while persons having a filtering device can avail themselves to a supply of clean and potable water as long as the device contains a new filter, once the filter become clogged either the user must have a replacement filter available, which is expensive, impractical, and unlikely, or the device will be rendered useless. The present inventor has thus also conceived of an arrangement for removing such contaminants and materials from the filter device quickly and easily, thereby making the filter reusable and extending its life more or less indefinitely. Both of such improvements are provided by the present device which not only can pump or force supplies of water through filters having a smaller pore size than would be possible with a regular manual sucking action, but in addition said same pumping action can be used to force contaminants and other materials clogging the filter out of such filter so that the device is ready to be used again.

It has also been found that the present water filtering and purifying device may be specially adapted for use in filtering water contained in bottles such as standard 16 ounce plastic water bottles, as well as other types of bottles and liquid reservoirs such as canteens. In particular, the device may be modified so that it includes a cap that fits the water bottle with which it is to be used. Furthermore, in another embodiment after entering the device through a pre-filter having a small pore size, the water is then passed or forced through both a disinfecting agent and an activated carbon bed to provide complete purification.

OBJECTS OF THE INVENTION

It is therefore a primary object of the present invention to provide a portable water filtering and purifying device to enable a supply of potable water to be obtained from a contaminated water supply.

It is a further object of the present invention to provide a water filtering and purifying device that can pass water through filters having a very small pore size to filter out a maximum number of contaminants from the water.

It is a still further object of the present invention to provide a water filtering and purifying device wherein the water is first passed into an outer chamber and then is forced into an inner chamber under force so that water is passed or physically forced through a main filter in the inner chamber and made potable.

It is a still further object of the present invention to provide a portable water purifying device comprised of an outer chamber and an inner chamber that is slidable within said outer chamber, whereby by a pumping action, water is first pulled into said outer chamber and then forced into said inner chamber where it is passed or physically forced across a filter and purified and then passed out of the inner chamber through a mouth piece.

It is a still further object of the present invention to provide a potable water supply by a forced pumping arrangement in an apparatus comprised of tubular components similar to a large mechanical straw.

It is a further object of the present invention to provide a mechanical forced pumping apparatus which can be carried in a person's breast pocket or other gear like a large pencil or pen.

It is a further object of the present invention to provide a water filtering device in accordance with the above objects wherein in addition a clogged water filter can be cleaned of debris by pumping water through said filter in a reverse direction.

It is a still further object of the present invention to provide a water filtering device having a sealing member on the outer surface of the mouthpiece portion of said device, whereby the mouthpiece and filter can be removed from the inner filter chamber and the mouthpiece the inserted into such inner filter chamber upside down at least up to said sealing member, after which water is pumped through said water filter in a reverse direction to force materials clogging said filter out of the filter so that it is reusable.

It is a still further object of the invention to enable the water purification device of the present invention to be connected to the neck of a container for holding water for use in filtering and purifying water stored in such container.

It is a still further object of the invention to provide a water purification device of a portable type wherein the water can be pre-filtered by a filter having a very small pore size before entering the device, and then is passed through both a disinfecting agent and an activated carbon bed to provide complete purification.

Still other objects and advantages of the invention will become clear upon review of the following detailed description in conjunction with the appended drawings.

SUMMARY OF THE INVENTION

A portable device for filtering and purifying water prior to drinking such water is disclosed. The device accomplishes this by a pumping action and is comprised of an outer chamber and an inner chamber that is slidable within the outer chamber, with an airtight seal between the chambers. A primary filter adapter is secured to the bottom end of the outer chamber, which supports a one-way check valve and a pre-filter through which water entering the outer chamber must pass. A second filter adapter also supporting a one-way check valve and a pre-filter is similarly secured to the lower end of the inner chamber, and a main filter is secured in the interior of the inner chamber. In use, the device is held with the lower end of the outer chamber immersed in a water supply. The inner chamber is slid upwardly out of the outer chamber, which causes water to be drawn into the outer chamber. Then, as the inner chamber is slidingly moved back into the outer chamber, water in the outer chamber is forced to flow into the inner chamber and out of the top of the outer chamber after it is forced through or across the main filter. The device may also in another embodiment include an integral cap member for securing the device to the neck of a water bottle containing water to be passed through the device to ensure that such water is potable. A key advantage of the present device is that a greater number of microbial and other contaminants may be captured by the main filter than with other portable filtering devices, since by applying pressure to the water in the inner chamber the water can be forced through a filter having a very small pore size.

In addition, the same pumping action can be used to push out accumulated contaminants and other debris clogging the filter by pumping water through said filter in a reverse direction, while in another embodiment the water is passed through both a disinfecting agent and activated carbon bed to provide complete purification.

DESCRIPTION OF THE PREFERRED EMBODIMENTS

The following detailed description is of the best mode or modes of the invention presently contemplated. Such description is not intended to be understood in a limiting sense, but to be an example of the invention presented solely for illustration thereof, and by reference to which in connection with the following description and the accompanying drawings one skilled in the art may be advised of the advantages and construction of the invention.

The present invention is directed to a water disinfecting and purifying device of a portable type wherein the device is comprised of an outer chamber into which the water is first drawn through a pre-filter, and a telescoping inner chamber, whereby as the inner chamber is moved out of the outer chamber a negative pressure is created in such outer chamber which draws water through a one-way check valve into the outer chamber. Then when the inner chamber is moved downwardly back into the outer chamber, the positive pressure generated causes the water to be forced through a one way valve adjacent the lower end of the inner chamber and into such inner chamber, where it is passed across either a filtering member, is mixed with a disinfecting agent, or both, so that a user placing his or her mouth on the mouthpiece can easily consume potable water from such device. In one embodiment, the device may be retrofitted for use with a canteen or water bottle containing potentially contaminated water, while several arrangements for cleaning and maintaining the filtering device in a usable form for extended periods are also provided. The main benefit of the present invention over the prior art is that by providing a pumping action the straw device generates a sufficiently greater pressure and force which allows the device to pass the water through filters having much smaller pore sizes than is possible with conventional straw type water filtering devices.

Figure 7:
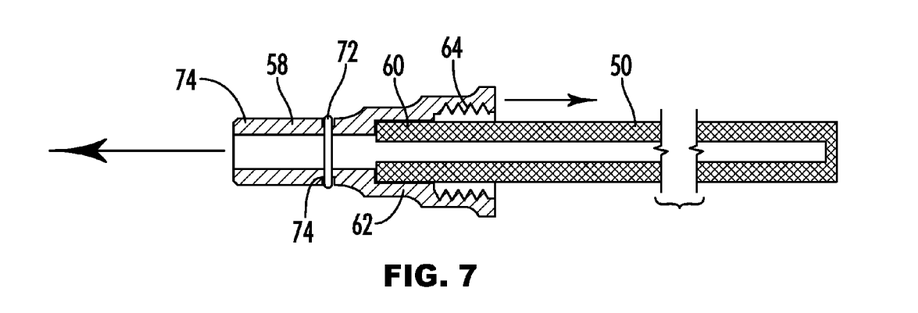
FIG. 7 is a cross-sectional view of an alternative mouthpiece and filter arrangement for use with the invention.
Figure 8:
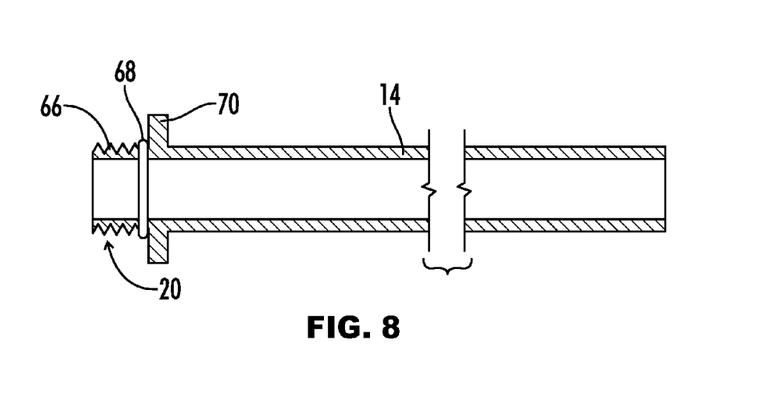
FIG. 8 is a cross-sectional view of the inner filter chamber for use with the alternative mouthpiece arrangement shown in FIG. 7.

FIGS. 1-6 illustrate a first preferred embodiment of the water disinfecting and purifying device of the present invention, FIGS. 7-8 illustrate an alternative mouthpiece arrangement for use with the device, FIGS. 9-12 illustrates an alternative embodiment for using the invention in combination with a canteen or water container, and FIGS. 13-19 illustrate another embodiment of the invention. Reference will now be made in detail to several preferred implementations of the present invention as illustrated in the accompanying drawings. Wherever possible, the same reference numbers will be used throughout the drawings and the following description to refer to the same or like parts.

Figure 1:
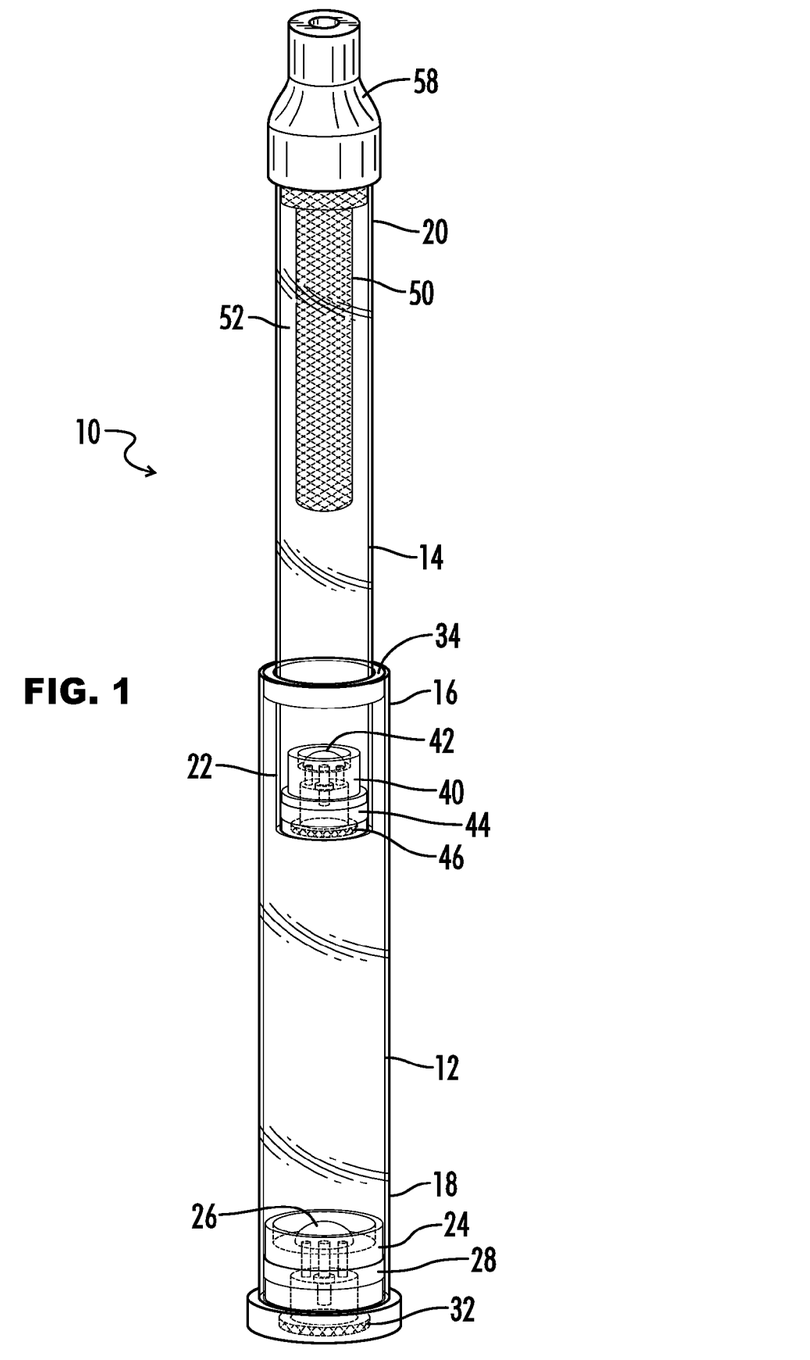
FIG. 1 is a side perspective and partially transparent view of the water purifying device of the present invention.
Figure 2:
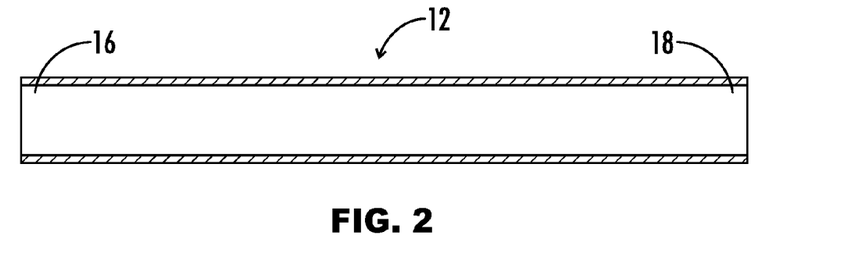
FIG. 2 is a cross-sectional view of the outer chamber of the water purifying device of the present invention.

Referring now to FIGS. 1-6, there is shown a first embodiment of the water purifying and filtering device 10 in accordance with the present invention. Device 10 includes an elongated outer chamber or receptacle 12 (see FIG. 2) and an elongated inner chamber or receptacle 14 (FIG. 3) that as shown in FIG. 1 is telescopingly slidable within said outer chamber 12 in an airtight manner. Outer chamber 12 is generally comprised of an upper end 16 and a lower end 18; similarly, inner chamber 14 has an upper end 20 and a lower end 22. Outer chamber 12 and inner chamber 14 are preferably made of a thermoplastic polymer such as polypropylene and have a tubular or cylindrical configuration; however, while the shown arrangement is convenient, such chambers could be made from other materials, and could have shapes other than being rounded such as triangular, rectangular, or other geometric shapes while still falling within the scope and accomplishing the purposes of the invention. In addition, the length and size of the chambers can be varied, although in a preferred embodiment the device is designed to be portable and carried conveniently on one's person in a shirt pocket, bag, duffel bag, or the like.

Figure 4:
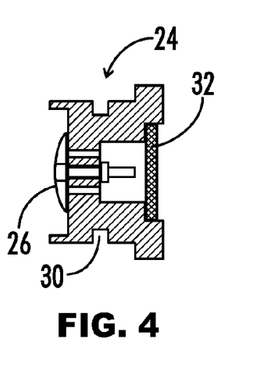
FIG. 4 is a cross-sectional view of the primary valve unit of the invention.

Primary valve unit 24, shown in cross-section in FIG. 4, is adapted to fit in an airtight manner in the lower end 18 of outer chamber 12 (see FIG. 1), and support a one-way check valve 26 that allows water to flow inwardly through unit 24 into outer chamber 12, but not out of outer chamber 12 through such valve 26. Sealing ring 28 (see FIG. 1) is secured in channel 30 (see FIG. 4) in the outer periphery of valve unit 24 to provide an airtight seal with the inner surface of chamber 12, and in addition a pre-filter 32 is seated in the lower end of primary valve unit 24 to filter or strain out in particular larger particles or contaminants that would otherwise be able to enter unit 24 and clog check valve 26. Pre-filter 32 preferably is removable from primary valve unit 24 so that it can be cleaned periodically as needed, or alternatively replaced with a new pre-filter having the same or a different pore size, depending on need and also on the quality of water to be purified by device 10. For example, a pre-filter with a significantly smaller pore size may be used in visibly cleaner water to filter out even smaller particles, while if the water is extremely murky or dirty a pre-filter having a large pore size may be necessary to allow water to more readily pass through check valve 26 without clogging, although as discussed below the pore sizes of such filters that can be effectively used with the present invention are significantly smaller than other known straw-like water filtering devices. Pre-filter 32 can be a microporous polypropylene or other material as desired. Alternatively, primary valve unit 24 may be removed from outer chamber 12 for cleaning and then reinserted in the lower end 18 of outer chamber 12. As shown in FIG. 1, a gasket or rubber sealing ring 34 is secured on the inner peripheral surface of outer chamber 12 around upper end 16 to ensure an airtight seal with the outer surface of inner chamber 14 as it is telescoped in and out of outer chamber 12 to purify and filter contaminants from water as discussed below. Other arrangements known to those skilled in the art for providing an airtight fit between outer chamber 12 and inner chamber 14 may also be utilized.

Figure 5:
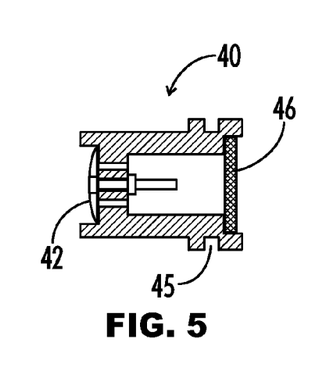
FIG. 5 is a cross-sectional view of the secondary valve unit of the invention.
Figure 6:
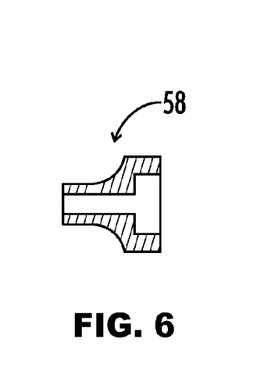
FIG. 6 is a cross-sectional view of the mouth piece of the present invention.

Secondary or inner chamber valve unit 40, shown in cross-section FIG. 5, similar to primary valve unit 24, is secured to the lower end 22 of inner chamber 14 (see FIG. 1). Note that in FIGS. 4 and 5 valve units 24 and 40 are shown as being larger than the inner diameter of outer and inner chambers 12 and 14 in FIGS. 2 and 3, respectively for exemplary purposes. The structure of inner valve unit 40 supports another one-way check valve 42 that allows water to pass into inner chamber 14 from lower end 22, but not out such lower end through valve 42. A gasket or sealing ring 44 is secured in channel 45 in the outer surface of valve unit 40. In addition, another pre-filter 46 is mounted over the bottom surface of valve unit 40 so that any water passing through valve unit 40 into inner chamber 14 first must pass through pre-filter 46. In a preferred arrangement, pre-filter 46 will be provided with a smaller pore size than pre-filter 32 in primary valve unit 24, such that during use of the invention water passing into outer chamber 12 through the first pre-filter 32 is further filtered to capture and filter out contaminants of a smaller size by second pre-filter 46 before entering inner chamber 14.

Figure 3:
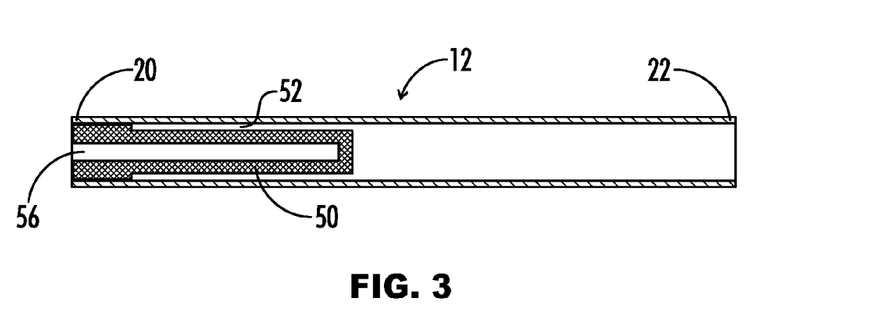
FIG. 3 is a cross-sectional view of the inner chamber of the water purifying device of the present invention.

Removably secured in the upper end 20 of inner chamber 14 is primary filter member 50, which filter is preferably an activated carbon/ceramic filter impregnated with traces of silver. Such filter is of a type known in the prior art that can trap contaminants such as bacteria as small as about 0.2 or 0.1 of a micron in particle size [1/100,000 of an inch]. Thus, before liquid is passed out of mouthpiece 58 during use of the invention, such water first must pass through activated carbon filter 50, which captures by adsorption virtually all remaining particulates in the aqueous solution. Regrowth of bacteria that becomes trapped either on the outside of the main filter element or in the activated carbon filter pores will be controlled by the silver which, on contact with water, releases small quantities of positively charged metals ions, which ions are taken into the enzyme system of the bacteria's cell and thereby neutralize it. Preferably, the filter may be cleaned to restore its flow rate by brushing its outer surface under clean running water, or a new activated carbon filter may be provided. As the top layer of ceramic and contaminants are brushed off and flushed away, a new layer becomes available. In addition, see the arrangement shown in FIGS. 7-8 for reverse flushing of main filter 50. Preferably, as shown in FIG. 3, the total surface area of filter member 50 is increased substantially by arranging such filter so that it extends a substantial distance downwardly into inner chamber 14, with a narrow channel 52 provided between the outer surface of main filter 50 and the inner walls of chamber 14. Water passing through outer or main filter 50 then accumulates in main or interior channel 56, which water having been purified then can exit the upper end 20 of inner chamber 14 through a mouth piece 58, shown in cross section in FIG. 6 and which is secured over the top end 20 of inner chamber 14 by a frictional fit or other suitable means known to those skilled in the art.

Unlike prior art conventional straw type water filtering devices known to the inventor, purification device 10 can be used with a primary or main filter having a substantially smaller pore size, and thus is much more effective than such other devices in removing microbial contaminants to ensure that the water is potable. Other known straw type water filtering devices cannot pass a suitable supply of water through a filter having a small pore size solely by suction or reverse pressure applied by the mouth of the user placed on mouth piece 58 and exerting a sucking action. With the present inventor's purifying device 10, however, when the lower end 18 of outer chamber 12 is dipped or lowered into a possibly contaminated water supply, water is easily pulled upwardly into outer chamber 12 through filter 32 and check valve 26 by the suction created as inner chamber 14 is moved upwardly out of outer chamber 12. Then, as inner chamber 14 is moved back down into outer chamber 12, such water drawn in outer chamber 12 now is forced to pass through filter 46 and one-way check valve 42 of inner valve unit 40 into inner chamber 14, and then is forced through main activated carbon filter member 50 in inner chamber 14 and out of inner chamber 14 via mouthpiece 58 into the user's mouth, a cup, or the like. Upon initiating use of device 10, inner chamber 14 is in a retracted position inside outer chamber 12, and device 10 is grasped and held with the lower end 18 of outer chamber 12 inserted in a supply of water to be filtered or purified, whether such water is in a bucket, lake, stream, or other source. Preferably, such water will be as free of visible contaminants as possible, and could be pre-filtered or strained by passing it through a cotton or the cloth or the like. Then, as indicated above, while the lower end 18 of outer chamber 12 is maintained in such water supply, inner chamber 14 is manually pulled slidingly upwardly so that a substantial portion is extending out of the upper end 16 of outer chamber 12. As inner chamber moves upwardly, a suction is created by the air in the chambers and water is caused to be pulled into outer chamber 12 through the opening adjacent check valve 26 in primary valve unit 24. Next, the user will typically place his or her mouth on mouth piece 58, and then manually urge inner chamber 14 back into a retracted position inside outer chamber 12, either by forcing outer chamber 12 upwardly or urging inner chamber 14 downwardly, or a combination of such movements. As inner chamber 14 is urged back into outer chamber 12, water in outer chamber 12 is prevented from exiting through lower end by one-way check valve 26, and thus is forced to enter inner chamber 14 through inner valve unit 50. Eventually, sufficient water has passed into inner chamber 14 so that it is substantially filled, with the water level in contact or commencing to press against and immerse filter member 50. Once the amount and force of the water entering inner chamber 14 becomes great enough, and in order for more water to enter inner chamber 14, water is then forced to pass through filter member 50, whereby such water is purified and made potable, and may then pass out of the inner chamber through mouthpiece 58.

Preferably, as indicated above, main filter 50 in inner chamber 14 will be removable from such inner chamber 14 for cleaning as the device is used over time and the main filter member becomes clogged with contaminants, such as by dipping the filter in a bleach cleaner or the like that will remove or neutralize any viruses, bacteria, protozoa, or other contaminants. It is also envisioned that inner chamber 14 may have a cartridge-type arrangement that allows for easy insertion, removal, or replacement of main filter member 50.

FIGS. 7-8 illustrate an alternative mouthpiece and main filter arrangement for use with the present invention, in which an improved arrangement for removing contaminants that have accumulated in the main filter out of such filter, thereby cleaning the filter so that is can be immediately reused is provided. More particularly, the upper end 60 of main filter 50 is secured to the lower end 62 of mouthpiece 58 such as by a jam-type or frictional fit, or by any other suitable manner. Mouthpiece 58 also includes a female threaded section 64 on its lower end, which threads are sized to match male threads 66 on the upper end 20 of inner chamber 14, thereby making mouthpiece 58 threadably removable from inner chamber 14. A sealing member such as gasket or O-ring 68 is provided adjacent the end of male threads 66 and against the upper end of lip or stop 70 extending outwardly at a right angle from end 20 of inner chamber 14, resulting in an airtight seal with female threads 64 when the mouth piece 58 is secured to inner chamber 14. In addition, another sealing member, preferably a gasket or O-ring 72, is positioned in cavity 74 on the outer surface of mouthpiece 58. The outer dimensions of mouthpiece 58 at least adjacent O-ring 72 are sized to be sealingly received in the upper end 20 of inner chamber 14. In other words, when mouthpiece 58 is unscrewed and removed from the top of inner chamber 14, the mouthpiece can be turned around and its outer end 74 inserted into chamber 14, at least up to and including sealing member 72, and with main filter 50 no longer being extending inwardly into chamber 14 but rather protruding outwardly from mouthpiece 58. The purpose of such arrangement is that now when device 10 is used to forcibly pass water from outer chamber 12 upwardly into inner chamber 14 and out mouthpiece 58 in the manner described above, such water will now be forced to pass through filter 50 in a reverse direction. Such reverse flow of water through filter 50 will cause the majority of contaminants that have accumulated in filter 50 due to use of the device to filter water as described above to be forced out of the filter and unclogging the filter. It has been found that clean water only needs to be pumped through filter 50 in a reverse direction as just described a limited number of times before such filter is substantially unclogged, after which the filter may then be inserted back into inner chamber 14 in its original use position to capture and filter out contaminants in a non-potable water supply. The presently described arrangement in effect will extend the life of the main filter indefinitely, as it can be repeatedly cleaned and reused with device 10 in the manner just described. Of course, when the filter 50 is being cleaned or unclogged in such manner, a substantially clean source of water should be passed through the filter. In addition, the filter should be dipped in a bleach solution or the like as described above to ensure that any remaining potentially harmful microscopic organisms in the filter are killed. Pre-filters 32 and 46 should also be cleaned as has already been described. If the filter is cleaned as just described using water from an impure source or that might contain further contaminants, once the filter is reinserted in inner chamber 14 and mouth piece 58 threadably secured, ideally a few units of water should be pumped through the filtering device and out of mouth piece to try to flush any potentially harmful substances that may have accumulated on the surface of the mouth piece or interior surface of the filter prior to consuming such water.

Figure 9:
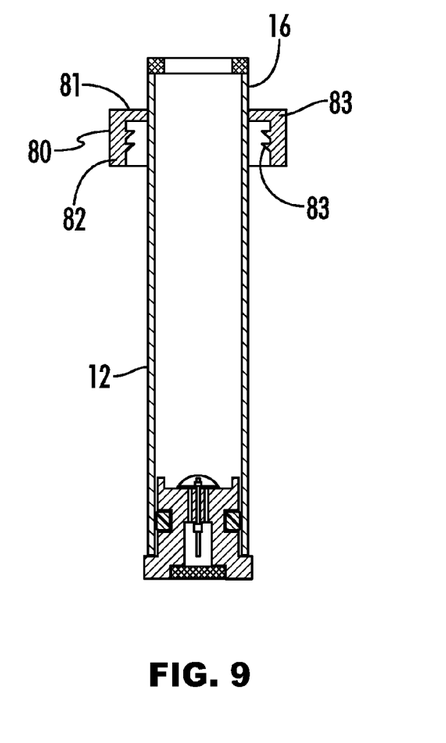
FIG. 9 is a cross-sectional view of an alternative embodiment of the outer chamber having a cap member for securing the water purifying device to the neck of a water bottle.

FIGS. 9-12 illustrate an alternative embodiment of the water purifying device of the present invention wherein such device has been fitted with a cap member for securing the device to a water container with the outer chamber extending downwardly into such container filled with water for the purpose of filtering such water using the device to ensure that such water is potable prior to drinking the water. FIG. 9 shows a cross-sectional view of outer chamber 12, which is fitted on its upper end 16 with a cap or lid member 80 having a top section 81 and side section 82, with threads 83 on the inner surface of side section 82. Cap member 80 may either be formed integrally with outer chamber 12, or may be secured to or around the outer surface of outer chamber 12 in a known manner such as by an adhesive or threaded fitting, or simply a frictional fit over the outer surface of outer chamber 12. Cap member 80 could also be rotatable in relation to outer chamber 12 via a collar member or the like, or may be rigidly connected as in the Figures.

Figure 10:
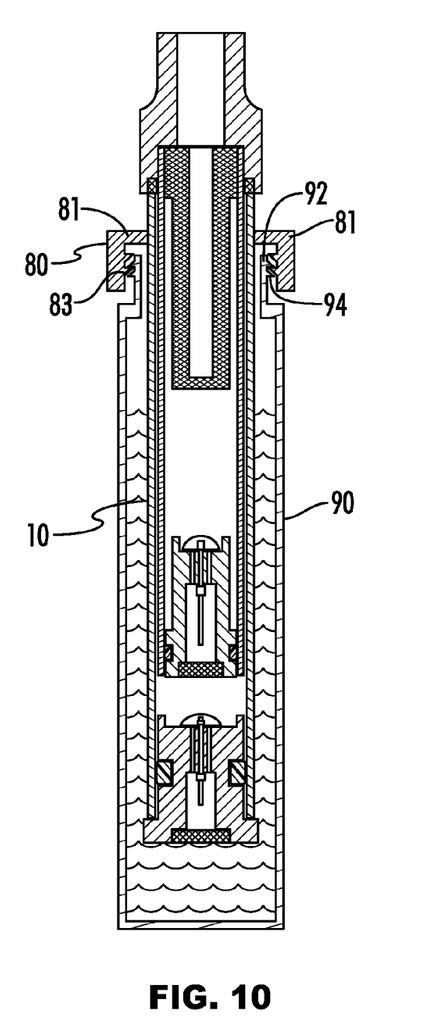
FIG. 10 is a cross-sectional view of the water purifying device of the present invention secured to a water bottle containing water.

As shown in FIG. 10, cap member 80 is sized to fit on container 90 around the neck 92 of such container. More particularly, threads 83 of cap member 80 match with threads 94 on the outer surface of neck 82 of container 80. In use, therefore, device 10 is inserted into container 90 up to cap member 80, and is secured in such position by threadably connecting cap member 80 to neck 92 of such container 90. A small air hole, not shown, may be provided in cap member 80 so that as explained below as the device is used a supply of air can replace the water being removed from the container 90.

Figure 11:
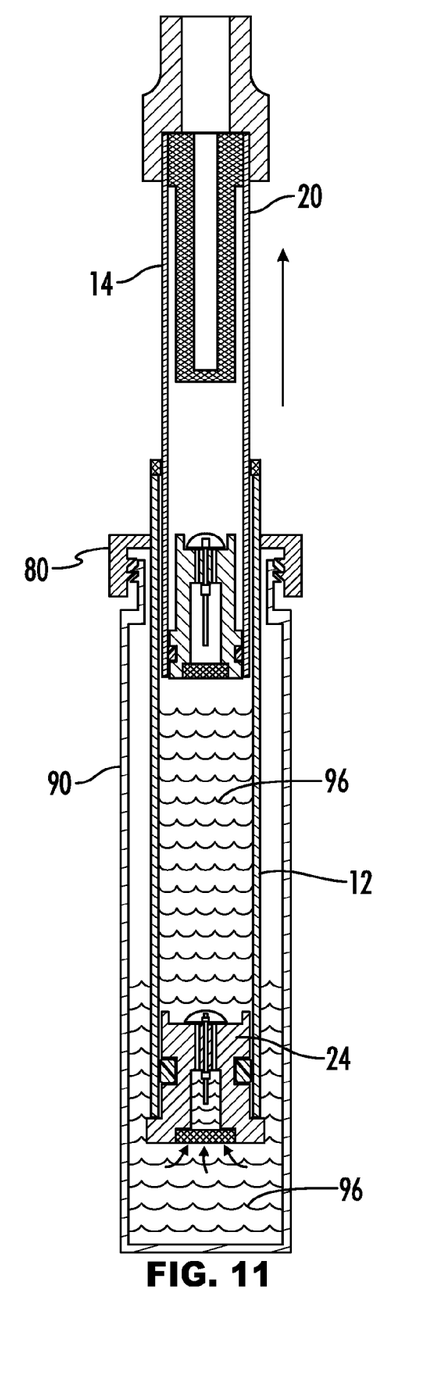
FIG. 11 is a cross-sectional view of the water purifying device of the present invention with water being drawn in the outer chamber.
Figure 12:
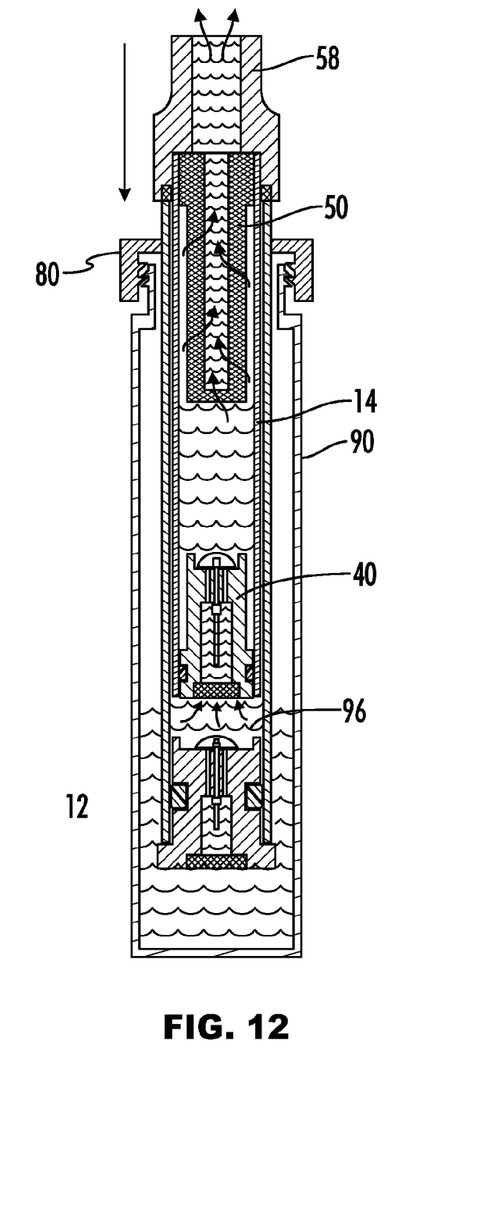
FIG. 12 is a cross-sectional view of the water purifying device of the present invention with water being drawn into the inner chamber through the main filter and out of the mouth piece.

FIGS. 11 and 12 illustrate generally a preferred manner of use of device 10 with cap 80 threadably secured to container 90. First, container 90 is grasped in one hand, and the upper end 20 of inner chamber 14 is grasped in the other hand and pulled upwardly as indicated by the arrow in FIG. 11. This causes water 96 in container 90 to be pulled upwardly into outer chamber 12 through primary valve unit 24. Then, as shown in FIG. 12, inner chamber 14 is pressed downwardly so that it slides back into outer chamber 12, which motion causes water 96 in outer chamber to be forced upwardly through inner valve unit 40 into inner chamber 14. As water accumulates in inner chamber 14, such water is then forced upwardly into contact with main filter 50, and is eventually forced to pass through main filter 50 and out mouth piece 58. Such device may be used in this manner until the water in container 90 is emptied, after which container 90 may either be refilled with water and the device used again, or alternatively container 90 could be discarded and device 10 could be secured to a new container 90 having an identically sized neck 92 and reused in a similar manner. It will be understood that the cap member 80 may be provided in different sizes to accommodate containers have necks of different dimensions. It will also be understood that while the cap member as shown is threaded to the container neck, it could also be secured to the neck of a bottle or container via a press or frictional fit.

Figure 15:
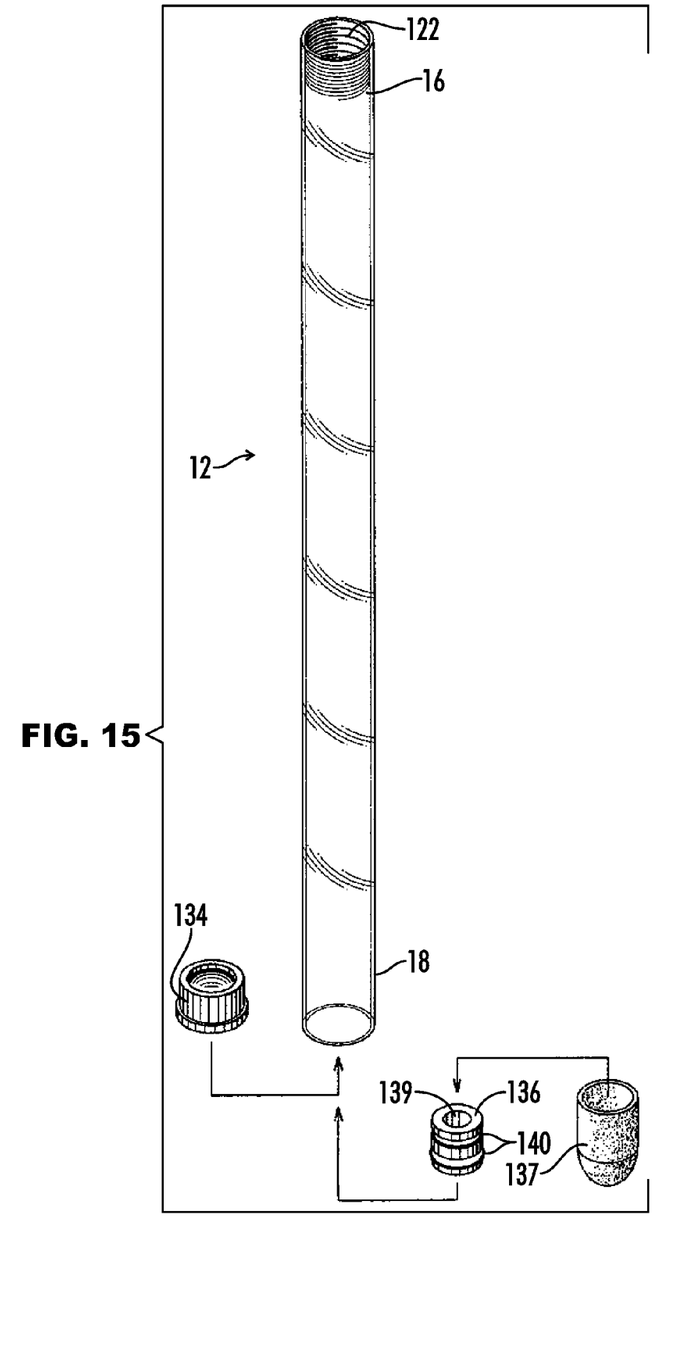
FIG. 15 is a side exploded view of the outer chamber of the water purifying and disinfecting device of the present invention.
Figure 16:
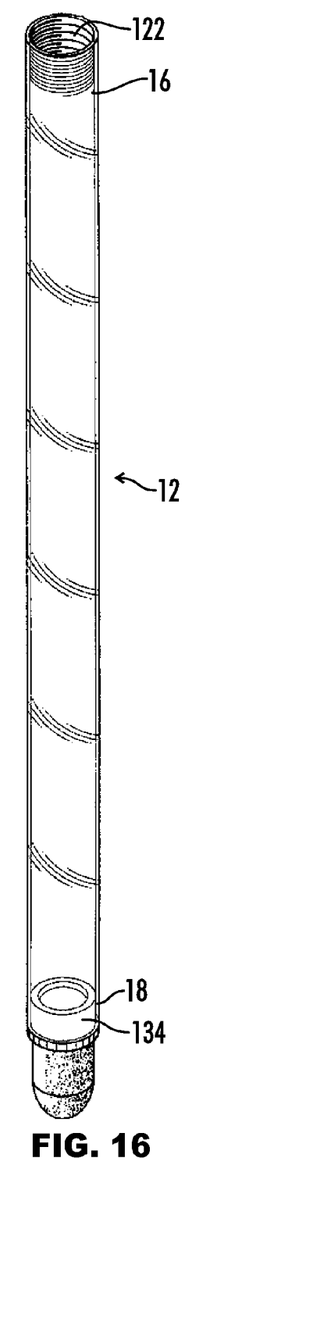
FIG. 16 is a side perspective view the outer chamber in an assembled form.
Figures 17, 18:
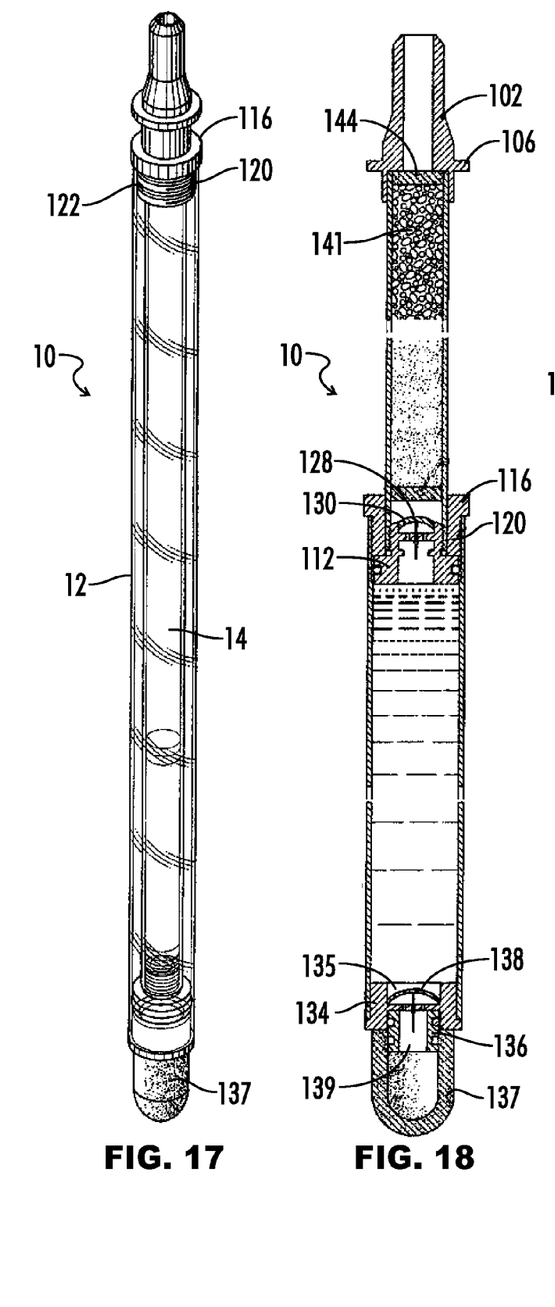
FIG. 17 is a side perspective view of the water purifying and disinfecting device of the invention in an assembled form.
FIG. 18 is a cross-sectional view showing water drawn into the bottom compartment of the outer chamber.
Figure 19:
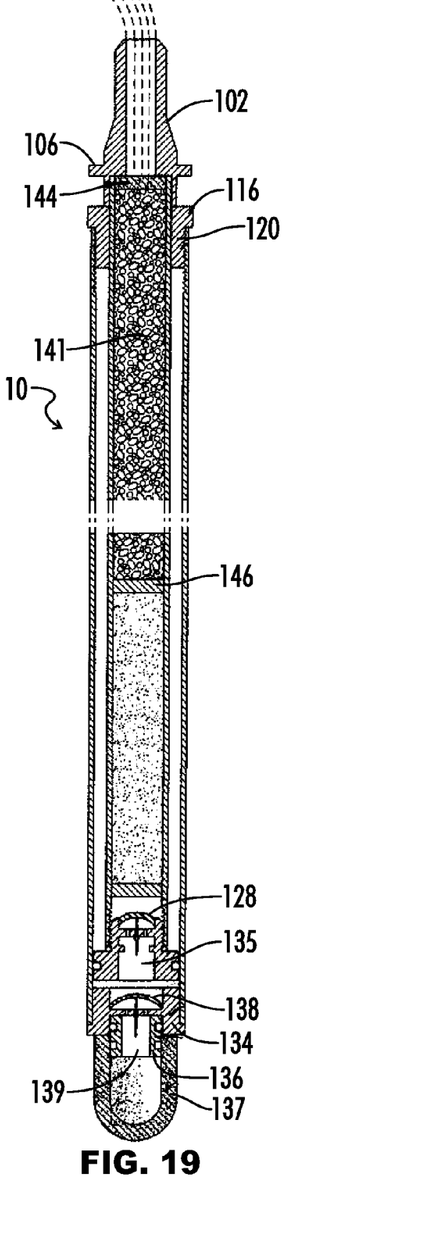
FIG. 19 is a cross-sectional view showing water being drawn out of the mouthpiece of the inner chamber.

FIGS. 13-19 illustrate another alternative embodiment of device 10. As in the previously described embodiments, device 10 has an outer chamber 12 and an inner chamber 14, shown in FIGS. 1 and 2, having an upper end 20 and a lower end 22, and a cap member 102 is secured over the upper end 20 of inner chamber or receptacle 14. Cap member 102 includes a mouthpiece section 104 having an internal orifice 107 through which disinfected and purified water exits device 10. In addition cap member 102 includes a cap section 105 which is tightly received over upper end 20 of chamber 14, and an outwardly flared peripheral lip 106 is provided between mouthpiece section 104 and cap section 105 to facilitate manual gripping of inner chamber 14 and telescopingly sliding such receptacle 14 in and out of outer chamber 12. Female threads 110 are provided on the inner surface of lower end 22 of inner chamber 14, and are adapted to receive male threaded section 114 on plug 112. Device 10 also includes a collar member 116 having a rim section 118 and a male threaded section 120 which is secured over inner chamber 14 (see FIG. 14). As is shown in FIGS. 17-19, threaded section 120 of collar member 116 engages with female threads 122 on the upper end 16 of outer chamber 12 so that such upper end 12 is pressed tightly against the underside of rim section 118, and inner chamber 14 is telescopingly secured to outer chamber 12. Plug 112 also has a rim section 124 with a gasket or sealing member 126 on its outer periphery such that when inner chamber 14 is placed in outer chamber 12, gasket or sealing member 126 engages and provides an airtight seal with the inner surface chamber 14. In addition, plug 112 has an internal passageway 128 in which a one-way check valve 130 is secured which allows an aqueous solution to flow from outer chamber 12 into inner chamber 14 through passageway 128, but prevents an aqueous solution from flowing through passageway 128 from inner chamber 14 outer chamber 12.

Figure 13:
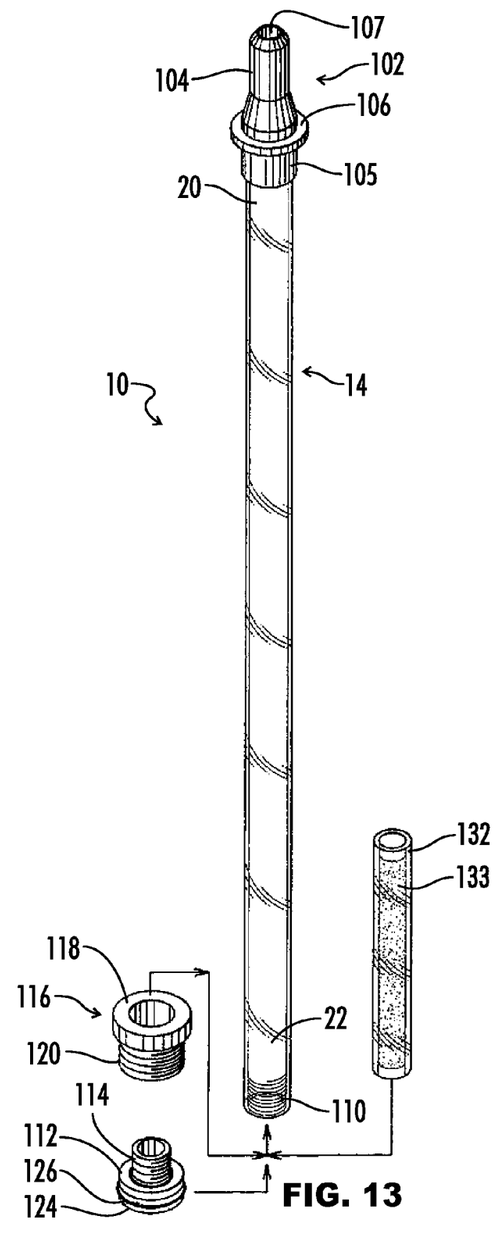
FIG. 13 is a side perspective view of the inner chamber of a slightly alternative embodiment the water purifying and disinfecting device of the present invention.

In addition, as shown in FIGS. 13 and 17, a cartridge 132 containing at least one disinfectant agent 133 is placed in lower end 22 of inner chamber 14. In FIGS. 15-16, insert 134 is shown which is secured to the lower end 18 of outer chamber 12, and as shown in FIGS. 18-19 insert 134 has a central passageway 135 the mouth of which is covered by filter member 137 via intermediate attachment sleeve 136, and a one-way check valve 138 is mounted in passageway 135 such that an aqueous solution can flow into outer chamber 12 through passageway 135, but cannot flow out passageway 135. More particularly, attachment sleeve 136 has a bore 139 and a pair of gasket or sealing rings 140 around its outer periphery and is tightly secured in the lower end of insert 134, to which sleeve pre-filter 137 is connected. Pre-filter 137 can be made of various porous substances such as polypropylene or ceramic material, and while pre-filter 137 is primarily designed to prevent particulate matter, sediment and like larger size contaminants from entering outer chamber 12 through check valve 138 and clogging up such valve, as is described herein and due to the large amount of suction that is generated by use of device 10 pre-filter 137 can also have a very small pore size such as five to ten microns or smaller and still allow water to be easily drawn through such pre-filter into outer chamber 12.

Figure 14:
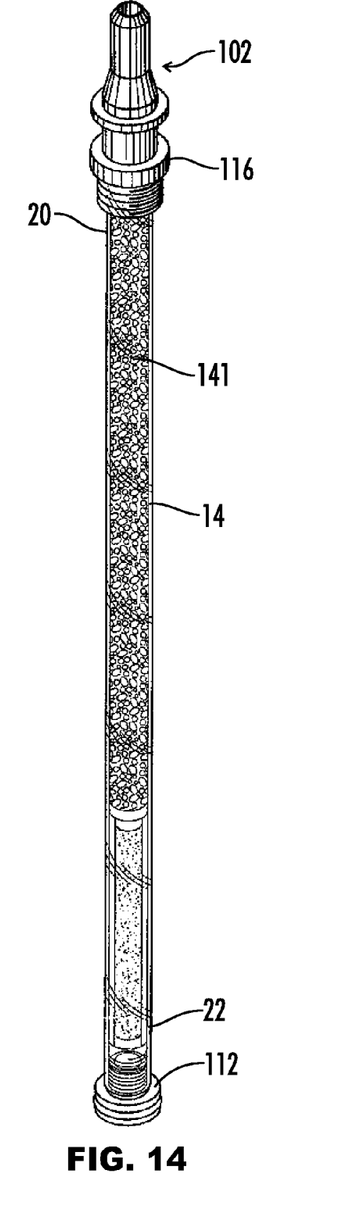
FIG. 14 is a side perspective view of the inner chamber shown in FIG. 13 with the cap for the outer chamber slidably shown thereon

In addition, as is shown in FIGS. 14 and 18-19 a purifying substance 141, which is preferably a granular activated carbon (GAC) bed, is housed in inner chamber 14 adjacent the mouth of orifice 107 in cap 102 leading to mouthpiece 104, and is prevented from spilling out of chamber 14 through orifice 107 by porous member 144 and separated from the lower section of inner chamber 14 by another porous member 146, just above cartridge 132 containing disinfecting agent 133. Alternatively, the granular activated carbon may be completely housed in a separate container which is inserted in inner chamber 14 and preferably also secured to cap 102. Thus, before liquid is passed out of mouthpiece 104 it first must pass through disinfecting agent 133, and then carbon bed 141. Cartridge 132 holds a disinfectant agent 133 such as an iodine resin so that water drawn into inner chamber 14 is immersed in said disinfectant agent for the required time period for the particular disinfecting agent or agents to be dispersed in the water and kill specific bacteria, viruses and/or protozoa and the like in the water. Device 10 may be gently shaken or twisted back and forth to ensure the disinfecting agent 133 has completely mixed with the water so that all of the water is properly sterilized or treated by the particular agent. A preferred disinfecting agent is an iodine resin comprised of a multitude of granules. In addition, the disinfecting agent 133 could also be provided floating free in inner chamber 14, rather than being contained in a cartridge 132 or the like, separated from carbon bed 141 by filter member 146 or the like.

The main advantages of the presently described embodiment should be obvious, in that due to the greater amount and negative and positive pressure created by the pumping action of the device, pre-filter 137 may have a very small filter size while still enabling sufficient quantities of water to be moved through the device and purified, and thus a larger number of contaminants are kept out of device 10. In addition, the water is passed through both a disinfecting agent 133 in cartridge 132, and then the activated carbon bed 141, so that the resulting water passed out of mouthpiece 102 as shown in FIG. 19 has been completely purified. In FIG. 18, water is shown drawn into lower or outer chamber 12 by the suction force generated by moving outer chamber out of such inner chamber, while FIG. 19 illustrates such water being now forced through check valve 128 into inner chamber 12 as the inner chamber is moved downwardly back into outer chamber 12, where the water comes into contact with both the disinfecting agent and activated carbon and purified water exits the device 12 through mouthpiece 102.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention.

The invention claimed is:

1. A portable water filtering and purifying apparatus comprising:
   (a) a first chamber having an entrance into which water to be made potable may be drawn by suction induced by negative pressure,
   (b) a second chamber having an inlet into which the water in the first chamber can be forced by a pumping action creating positive pressure, and an outlet,
   (c) a mouthpiece mountable over the outlet of the second chamber
   (d) a micro-filtering substance positioned within a section of the second chamber through which water can be forced by said pumping action to an outlet for purified water, said micro-filtering substance detachably secured to the mouthpiece,
   (e) a macro-filter or micro-filter disposed for preliminary filtration of water prior to being drawn by suction into the first chamber by said negative pressure,
   (f) a macro-filter disposed at the inlet of the second chamber for preliminary filtration of water being forced into the second chamber by positive pressure,
   (g) said mouthpiece additionally comprising a threaded connection between said second chamber and mouth piece; and a sealing member provided on the outer surface of said mouth piece, whereby said mouth piece is mountable to the second chamber in a reverse orientation such that the outer surface of the mouth piece is at least partially inserted into the second chamber, and a seal is created between the inner surface of said chamber and the sealing member allowing water to be pumped through the mouth piece and micro filtering substance in a reverse direction to remove debris clogging said substance.

2. A portable water filtering and purifying apparatus in accordance with claim 1 in which the second chamber is telescopically slideable within the first chamber to provide both an initial negative pressure within the first chamber for drawing water into the first chamber as the second chamber is withdrawn from the first chamber, and to provide positive pressure in the first chamber as the second chamber is returned into the said first chamber.

3. A portable water filtering and purifying apparatus in accordance with claim 2 additionally comprising check valves located at the entrance of the first chamber and the inlet to the second chamber to allow passage of water in only one direction from an exterior water source into the first chamber and the first chamber into the second chamber, but not in the reverse direction.

4. A portable filtering and purifying apparatus in accordance with claim 3 in which the chambers are in the form of close fitting tubular elements with the second chamber in sliding engagement with the first chamber.

5. A portable filtering and purifying apparatus in accordance with claim 4 in which the walls of the first and second chambers are transparent or translucent to allow the operator to monitor the internal operation.

6. A portable water filtering and purifying apparatus in accordance with claim 5 additionally comprising a flexible gasket means connected to the second chamber and situated between the walls of the first and second chambers to seal against leakage of water.

7. A portable water filtering and purifying apparatus in accordance with claim 1 additionally comprising a disinfecting agent provided within a section of the second chamber.

8. A portable water filtering and purifying apparatus in accordance with claim 1 additionally comprising a cap member for attaching said apparatus to a water container.

* * * * *